United States Patent
Ko et al.

(10) Patent No.: US 12,272,782 B2
(45) Date of Patent: Apr. 8, 2025

(54) SECONDARY BATTERY

(71) Applicant: LG CHEM, LTD., Seoul (KR)

(72) Inventors: Myung Hoon Ko, Daejeon (KR); Yong Tae Lee, Daejeon (KR); Jung Il Park, Daejeon (KR); Jee Ho Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 851 days.

(21) Appl. No.: 17/251,968

(22) PCT Filed: Oct. 1, 2019

(86) PCT No.: PCT/KR2019/012788
§ 371 (c)(1),
(2) Date: Dec. 14, 2020

(87) PCT Pub. No.: WO2020/071717
PCT Pub. Date: Apr. 9, 2020

(65) Prior Publication Data
US 2021/0257652 A1  Aug. 19, 2021

(30) Foreign Application Priority Data
Oct. 5, 2018 (KR) .................. 10-2018-0118865

(51) Int. Cl.
*H01M 10/04* (2006.01)
*H01M 10/0587* (2010.01)
(Continued)

(52) U.S. Cl.
CPC ... *H01M 10/0431* (2013.01); *H01M 10/0422* (2013.01); *H01M 10/0587* (2013.01); *H01M 50/107* (2021.01); *H01M 50/116* (2021.01)

(58) Field of Classification Search
CPC .......... H01M 10/0431; H01M 50/107; H01M 50/116; H01M 10/0422; H01M 10/0587
(Continued)

(56) References Cited

U.S. PATENT DOCUMENTS

2002/0110729 A1* 8/2002 Hozumi ................ H01G 11/70
429/211
2003/0215700 A1* 11/2003 Hosoda ............. H01M 10/0481
429/130
(Continued)

FOREIGN PATENT DOCUMENTS

CN     1747220 A     3/2006
CN     102549810 A   7/2012
(Continued)

OTHER PUBLICATIONS

English language machine translation of "Battery, Battery Pack, and their Manufacturing Method" By Shimizu Shintaro et al. in JP2005276814 (A)—Oct. 6, 2005 (Year: 2005).*
(Continued)

*Primary Examiner* — Jonathan G Jelsma
*Assistant Examiner* — Omar M Kekia
(74) *Attorney, Agent, or Firm* — Birch, Stewart, Kolasch & Birch, LLP

(57) ABSTRACT

A secondary battery having an electrode assembly in which a positive electrode, a separator, and a negative electrode are alternately stacked, and a can configured to accommodate the electrode assembly is provided. The negative electrode is disposed on an end of the electrode assembly in a direction of one side of the electrode assembly so that a negative electrode non-coating portion protrudes more than the separator with respect to a direction of a winding center axis of the electrode assembly. The positive electrode is disposed on an end of the electrode assembly in a direction of the other
(Continued)

side of the electrode assembly so that a positive electrode non-coating portion protrudes more than the separator with respect to the direction of the winding center axis of the electrode assembly. The can includes a first can contacting the positive electrode and a second can contacting the negative electrode.

18 Claims, 18 Drawing Sheets

(51) Int. Cl.
  *H01M 50/107* (2021.01)
  *H01M 50/116* (2021.01)
(58) Field of Classification Search
  USPC .......................................................... 429/164
  See application file for complete search history.

(56) References Cited

U.S. PATENT DOCUMENTS

| | | |
|---|---|---|
| 2004/0247999 A1 | 12/2004 | Shirane et al. |
| 2006/0073380 A1* | 4/2006 | Kim .................. H01M 10/0587 29/623.1 |
| 2006/0216588 A1 | 9/2006 | Kim et al. |
| 2006/0257735 A1 | 11/2006 | Kim |
| 2006/0275665 A1 | 12/2006 | Hyung et al. |
| 2011/0091748 A1 | 4/2011 | Hyung et al. |
| 2011/0217576 A1* | 9/2011 | Ueda .................. H01M 10/0587 429/94 |
| 2012/0015224 A1 | 1/2012 | Pytlik et al. |
| 2012/0100406 A1 | 4/2012 | Gaugler |
| 2012/0114989 A1 | 5/2012 | Caumont et al. |
| 2012/0251854 A1* | 10/2012 | Kusama .............. H01M 50/325 429/62 |
| 2015/0111094 A1 | 4/2015 | Katayama et al. |
| 2015/0372339 A1 | 12/2015 | Pytlik et al. |
| 2016/0141561 A1 | 5/2016 | Watanabe et al. |
| 2016/0260997 A1 | 9/2016 | Lee et al. |
| 2017/0025703 A1 | 1/2017 | Pytlik et al. |
| 2017/0033325 A1 | 2/2017 | Han et al. |
| 2017/0084901 A1* | 3/2017 | Doo .................. H01M 50/534 |
| 2017/0365874 A1 | 12/2017 | Pytlik et al. |
| 2018/0013101 A1 | 1/2018 | Gaugler |
| 2020/0099018 A1 | 3/2020 | Gaugler |
| 2020/0185755 A1 | 6/2020 | Pytlik et al. |
| 2020/0212473 A1 | 7/2020 | Pytlik et al. |
| 2020/0212474 A1 | 7/2020 | Pytlik et al. |
| 2020/0194820 A1 | 8/2020 | Pytlik et al. |
| 2021/0175535 A1 | 6/2021 | Pytlik et al. |
| 2021/0184321 A1* | 6/2021 | Kim .................. H01M 10/0525 |
| 2021/0265686 A1 | 8/2021 | Gaugler |
| 2021/0399370 A1 | 12/2021 | Gaugler |
| 2022/0209279 A1 | 6/2022 | Pytlik et al. |

FOREIGN PATENT DOCUMENTS

| | | |
|---|---|---|
| CN | 105324877 A | 2/2016 |
| CN | 106410066 A | 2/2017 |
| CN | 102804473 A | 12/2024 |
| DE | 10 2009 060 788 A1 | 6/2011 |
| EP | 1 717 895 A1 | 11/2006 |
| JP | 11-283606 A | 10/1999 |
| JP | 2001-93566 A | 4/2001 |
| JP | 2001-202985 A | 7/2001 |
| JP | 2003-31266 A | 1/2003 |
| JP | 2003-123846 A | 4/2003 |
| JP | 2005-276814 A | 10/2005 |
| JP | 3807528 B2 | 8/2006 |
| JP | 2007-234306 A | 9/2007 |
| JP | 2009-518789 A | 5/2009 |
| JP | 2009-166929 A | 7/2009 |
| JP | 2011-54539 A | 3/2011 |
| JP | 2011-171014 A | 9/2011 |
| JP | 2012-38439 A | 2/2012 |
| JP | 2012-517658 A | 8/2012 |
| JP | 2012-530337 A | 11/2012 |
| JP | 5093581 B2 | 12/2012 |
| JP | 2015-82386 A | 4/2015 |
| JP | 2016-100122 A | 5/2016 |
| KR | 10-2006-0103027 A | 9/2006 |
| KR | 10-2006-0104332 A | 10/2006 |
| KR | 10-2007-0037882 A | 4/2007 |
| KR | 10-2013-0003426 A | 1/2013 |
| KR | 10-2016-0010121 A | 1/2016 |
| KR | 10-2016-0107416 A | 9/2016 |
| KR | 10-2016-0141944 A | 12/2016 |
| KR | 10-2017-0110821 A | 10/2017 |

OTHER PUBLICATIONS

Extended European Search Report for European Application No. 19869271.7, dated Mar. 21, 2022.
International Search Report issued in PCT/KR2019/012788 (PCT/ISA/210), dated Jan. 16, 2020.
Partial Supplementary European Search Report for European Application No. 19869271.7, dated Dec. 9, 2021.
European Communication pursuant to Article 94(3) EPC for European Application No. 19 869 271.7 dated Oct. 6, 2023.

* cited by examiner

SECONDARY BATTERY

CROSS-REFERENCE TO RELATED APPLICATION

The present application claims the benefit of the priority of Korean Patent Application No. 10-2018-0118865, filed on Oct. 5, 2018, which is hereby incorporated by reference in its entirety.

TECHNICAL FIELD

The present invention relates to a secondary battery.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Secondary batteries are classified into coin type cells, cylindrical type cells, prismatic type cells, and pouch type cells according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length. Among them, the jelly-roll type electrode assembly is widely used because the jelly-roll type electrode assembly has an advantage is easily manufactured and has high energy density per weight.

DISCLOSURE OF THE INVENTION

Technical Problem

One aspect of the present invention is to provide a secondary battery that is capable of reducing resistance and a temperature variation for each position of an electrode in a wound electrode assembly.

Another aspect of the present invention is to provide a secondary battery having excellent meandering alignment when an electrode assembly is wound.

Technical Solution

A secondary battery according to an embodiment of the present invention comprises an electrode assembly in which a positive electrode, a separator, and a negative electrode are alternately stacked, and a can configured to accommodate the electrode assembly, wherein the negative electrode is disposed on an end of the electrode assembly in a direction of one side of the electrode assembly so that a negative electrode non-coating portion that is not coated with a negative electrode active material protrudes more than the separator with respect to a direction of a winding center axis of the electrode assembly, the positive electrode is disposed on an end of the electrode assembly in a direction of the other side of the electrode assembly so that a positive electrode non-coating portion that is not coated with a positive electrode active material protrudes more than the separator with respect to the direction of the winding center axis of the electrode assembly, the can comprises a first can and a second can, and the negative electrode non-coating portion directly contacts an inner surface of the first can, and the positive electrode non-coating portion directly contacts an inner surface of the second can.

The negative electrode non-coating portion may be formed on an entire end of one side of the negative electrode in a winding direction. The positive electrode non-coating portion may be formed on an entire end of an opposite side of the positive electrode in the winding direction.

The secondary battery may further include a center pin disposed in a winding center portion of the electrode assembly. The electrode assembly may be wound while surrounding the center pin.

The electrode assembly may be wound in a state of being fixed to the center pin by a tape.

Each of the positive electrode, the separator, and the negative electrode may be wound around an outer circumferential surface of the center pin to form a plurality of layers in a thickness direction of the electrode assembly with respect to the winding center axis of the electrode assembly.

The center pin may be an insulation material.

The center pin may be provided in a cylindrical shape.

A length of the center pin in the direction of the winding center axis of the electrode assembly may be less than a distance from an end of one side of the negative electrode non-coating portion to an end of an opposite side of the positive electrode non-coating portion.

A length of the separator in the direction of the winding center axis of the electrode assembly may be the same as the length of the center pin.

A length of the separator in the direction of the winding center axis of the electrode assembly may be greater than the length of the center pin and less than a distance from the end of the one side of the negative electrode non-coating portion to the end of the opposite side of the positive electrode non-coating portion.

One side of the center pin may be disposed to be spaced apart from the inner surface of the first can, and an opposite side of the center pin may be disposed to be spaced apart from the inner surface of the second can.

A length of the center pin in the direction of the winding center axis of the electrode assembly may be the same as a distance from an end of one side of the negative electrode non-coating portion to an end of an opposite side of the positive electrode non-coating portion.

One side of the center pin surface-contacts the inner surface of the first can, and an opposite side of the center pin surface-contacts the inner surface of the second can.

A length of the center pin in the direction of the winding center axis of the electrode assembly is greater than a distance from an end of one side of the negative electrode non-coating portion to an end of an opposite side of the positive electrode non-coating portion.

The center pin protrudes to an outside of the first can and the second can.

The center pin may be an insulation material. A conductive material may be applied to one side and an opposite side of the center pin in the direction of the winding center axis of the electrode assembly. The first can and the one side of the center pin may be electrically connected to each other so that the one side of the center pin forms a positive electrode terminal, and the second can and the opposite side of the center pin may be electrically connected to each other so that the opposite side of the center pin forms a negative electrode terminal.

A central portion of each of the first can and the second can may be fixed to the center pin.

The negative electrode non-coating portion may be bent to contact the first can, and the positive electrode non-coating portion may be bent to contact the second can.

The center pin may be hollow.

Advantageous Effects

According to the present invention, all the electrodes of the wound electrode assembly may be directly connected to the can continuously to reduce the resistance and temperature variation for each position of the electrodes.

In addition, according to the present invention, when the electrode collector is pressed to increase in welding area while the electrode is connected to the bottom surface of the can, the center pin may provide the reference surface to secure the certain level of the welding quality and the resistance deviation.

In addition, according to the present invention, the center pin may be provided in the core portion of the electrode assembly in the secondary battery to prevent the electrode disposed in the core part of the electrode assembly from being cracked as the charging/discharging cycle is progressed.

In addition, according to the present invention, as the electrode assembly is wound around the center pin, the meandering alignment of the electrode and the separator may be excellent.

In addition, according to the present invention, the cylindrical center pin may provide the electrolyte storage space until the electrode assembly is immersed in the electrolyte and may provide the space for collecting the internal gas according to the progress of the charge/discharge cycle.

MODE FOR CARRYING OUT THE INVENTION

Figure 1:
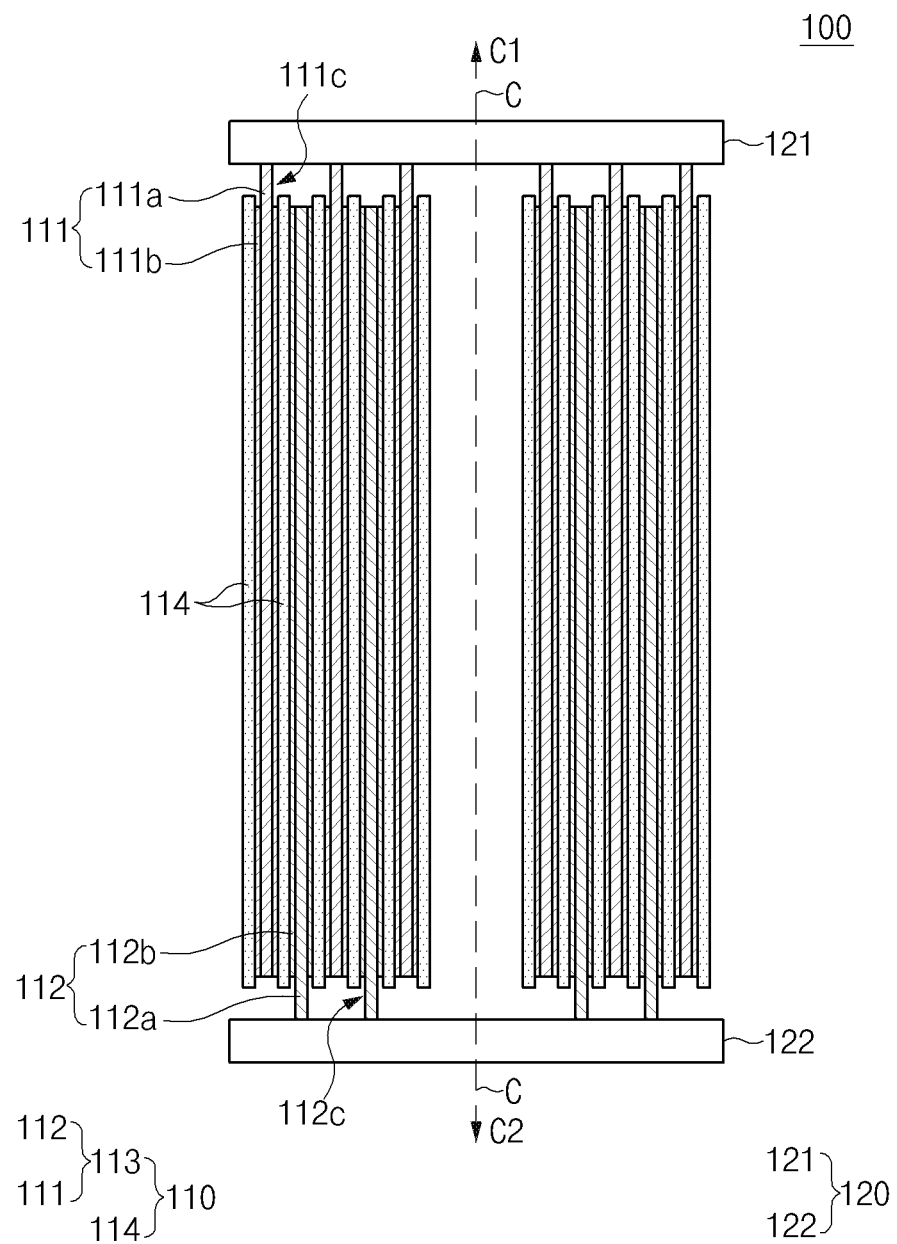
FIG. 1 is a cross-sectional view illustrating an example of a secondary battery according to a first embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

FIG. 1 is a cross-sectional view illustrating an example of a secondary battery according to a first embodiment of the present invention.

Referring to FIG. 1, a secondary battery 100 according to a first embodiment of the present invention comprise an electrode assembly 110 in which a positive electrode 112, a separator 114, and a negative electrode 111 are alternately stacked and a can 120 comprising a first can 121 and a second can 122 to accommodate the electrode assembly 110. Here, a negative electrode non-coating portion 111c contacts the first can 121, and a positive electrode non-coating portion 112c contacts an inner surface of the second can 122.

Hereinafter, the secondary battery according to the first embodiment of the present invention will be described in more detail with reference to FIGS. 1 to 6.

Referring to FIG. 1, the secondary battery 100 comprises the electrode assembly 110 and the can 120 accommodating the electrode assembly 110. Here, the secondary battery 100 may further comprise an electrolyte accommodated in the can 120 together with the electrode assembly 110.

Figure 2:
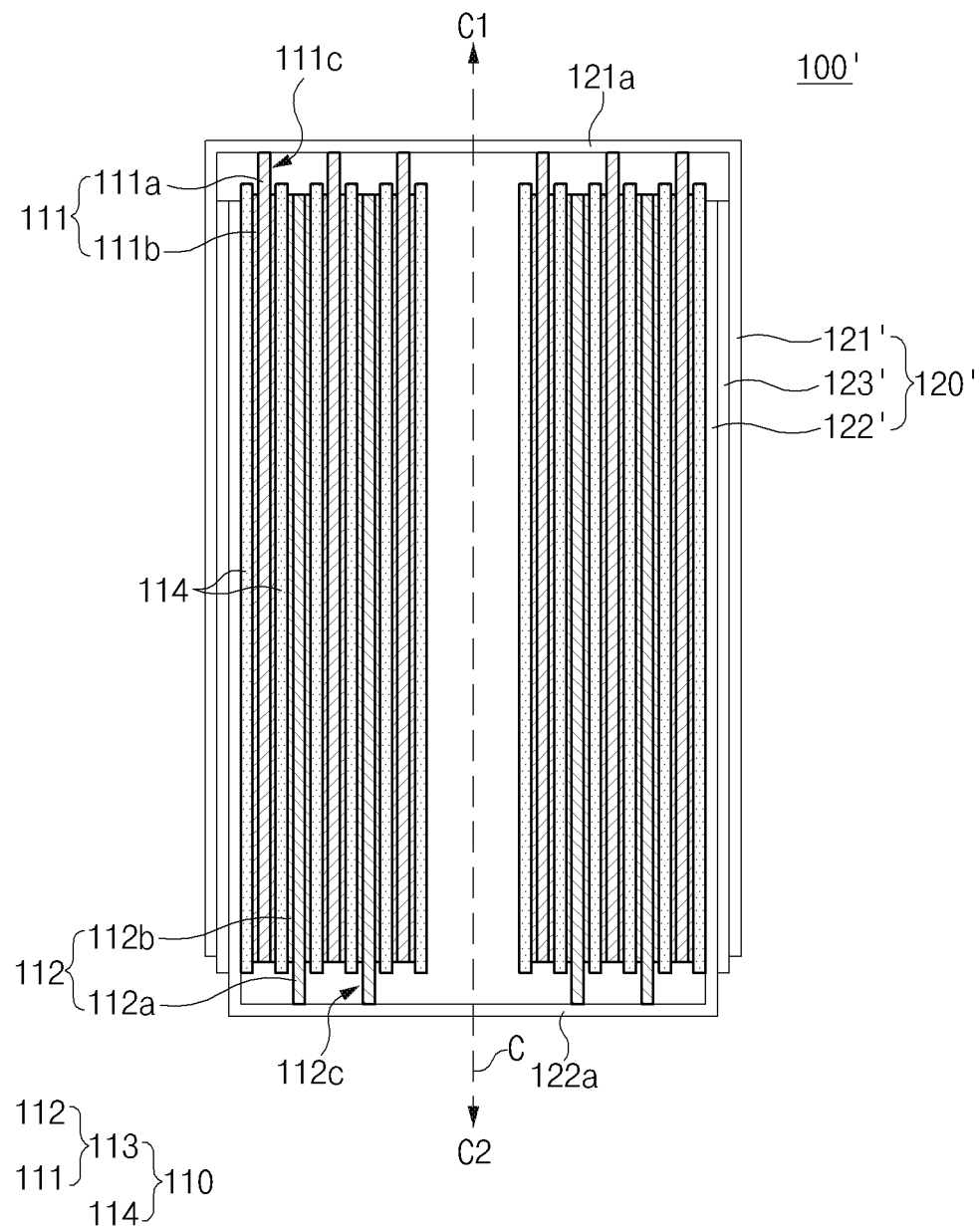
FIG. 2 is a cross-sectional view illustrating another example of a can in the secondary battery according to the first embodiment of the present invention.

FIG. 2 is a cross-sectional view illustrating another example of the can in the secondary battery according to the first embodiment of the present invention.

The can 120 may comprise the first can 121 and the second can 122 to accommodate the electrode assembly 110 therein.

Also, an end of the negative electrode 111 is connected to the first can 121, and an end of the positive electrode 112 is connected to an end of the second can 122, but the present invention is not limited thereto. For example, an end of the positive electrode may be connected to the first can 121, and an end of the negative electrode 111 may be connected to the second can 122. Here, the first can 121 may be connected to the negative electrode 111 to have a negative potential, and the second can 122 may be connected to the positive electrode 112 to have a positive potential. Here, the first can 121 may be made of, for example, steel, and the second can 122 may be made of, for example, aluminum (Al).

Although the first can 121 and the second can 121 are illustrated to being located only on upper and lower portions of the electrode assembly 110 in FIG. 1, this is illustrated as an example of the can 120 in the secondary battery 100. As illustrated in FIG. 2, as another example of a can 120' in a secondary battery 100', a first can 121' and a second can 122' may have cylindrical shapes that are opened in a direction facing each other. Here, the can 120' may further comprise an insulator 123' that insulates an overlapping portion between the first can 121' and the second can 122'.

Figure 3:
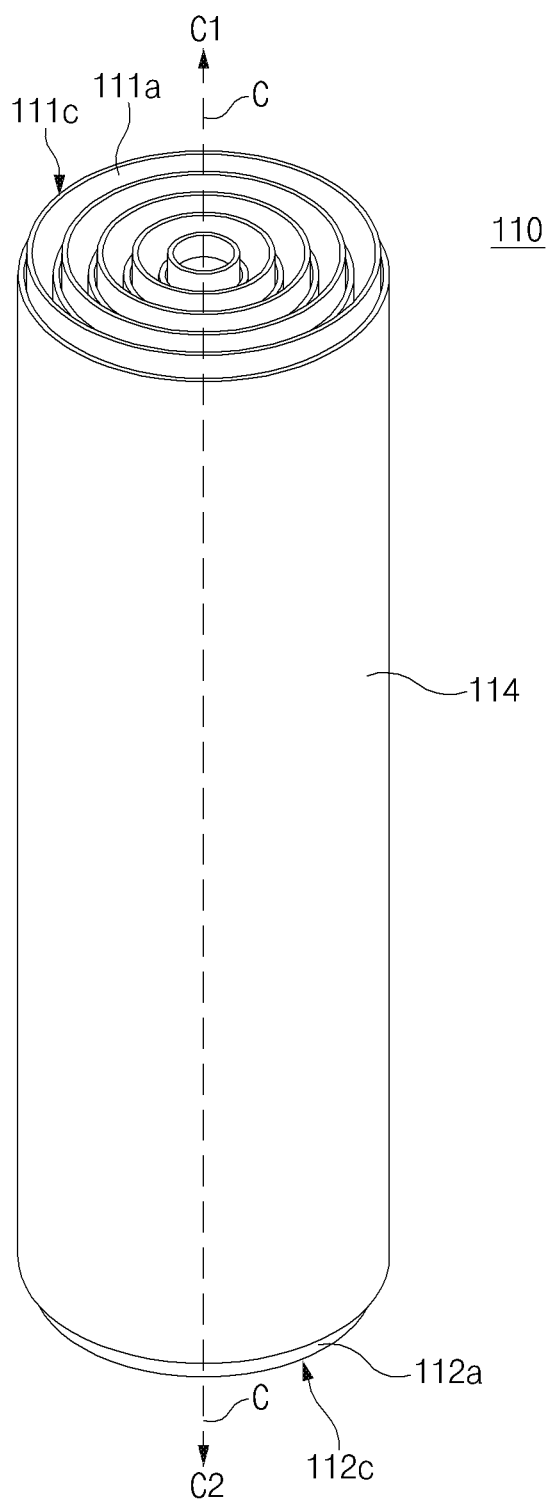
FIG. 3 is a perspective view of an electrode assembly in the secondary battery according to the first embodiment of the present invention.
Figure 4:
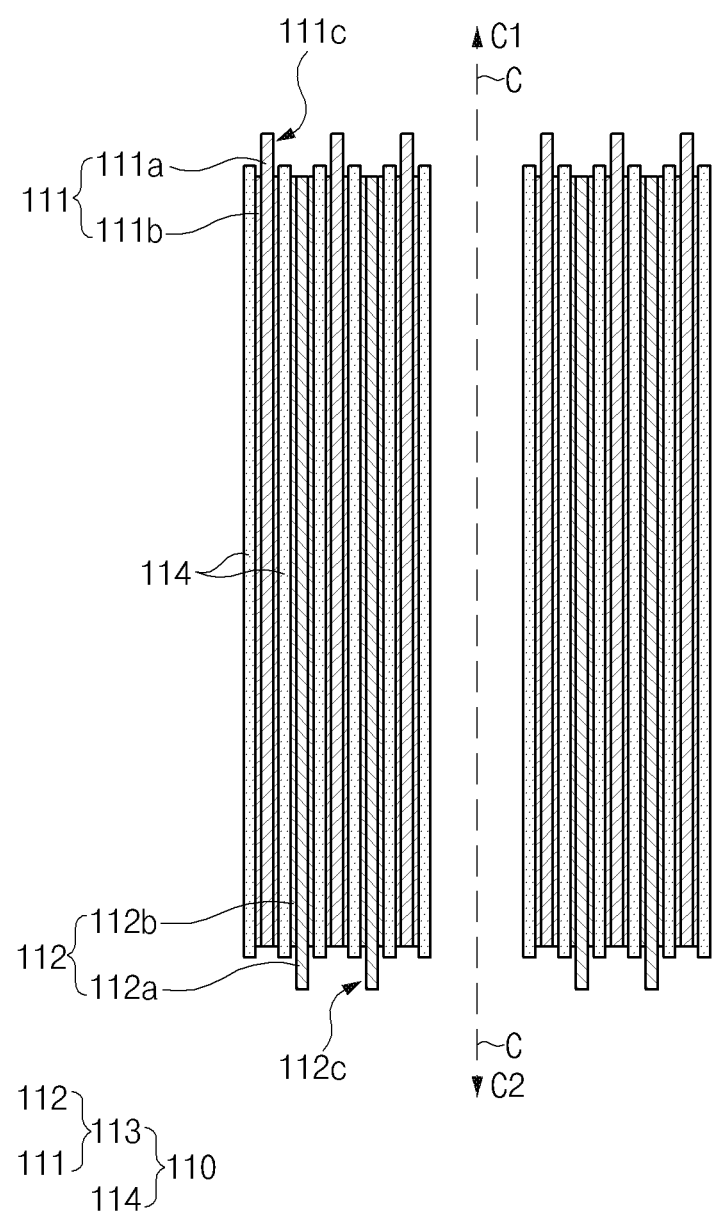
FIG. 4 is a cross-sectional view of the electrode assembly in the secondary battery according to the first embodiment of the present invention.

FIG. 3 is a perspective view of the electrode assembly in the secondary battery according to the first embodiment of the present invention, and FIG. 4 is a cross-sectional view of the electrode assembly in the secondary battery according to the first embodiment of the present invention.

Figure 5:
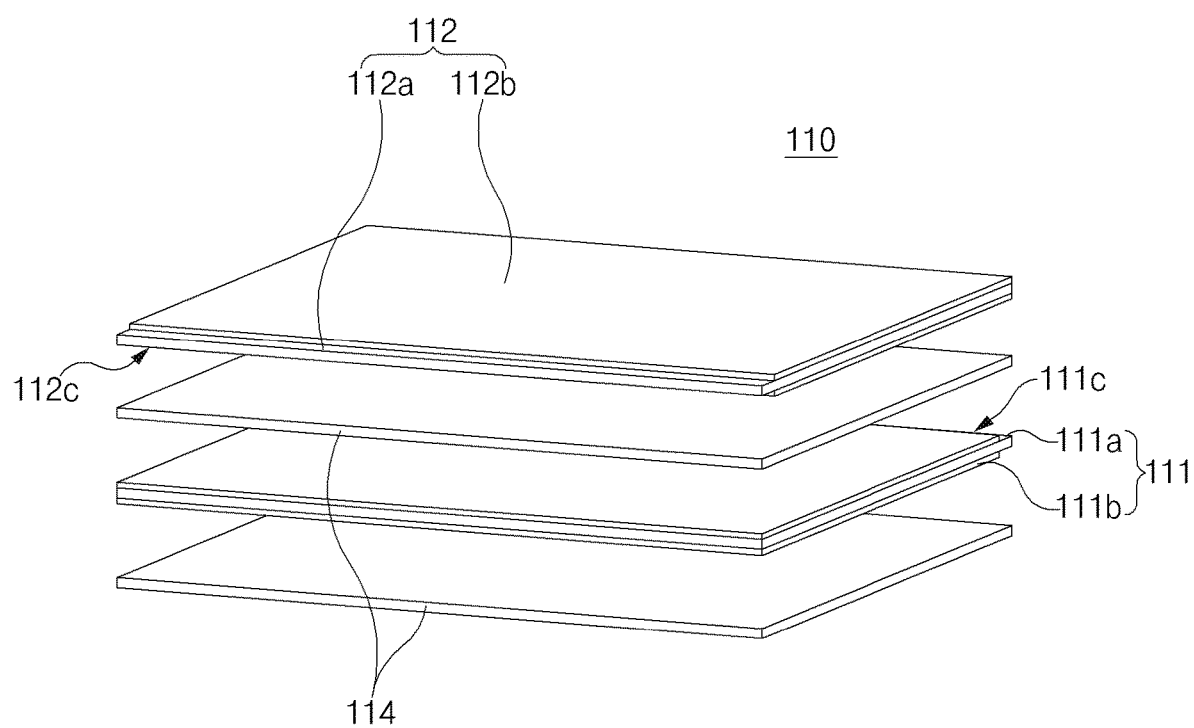
FIG. 5 is an exploded perspective view illustrating a state in which the electrode assembly is spread before being wound in the secondary battery according to the first embodiment of the present invention.
Figure 6:
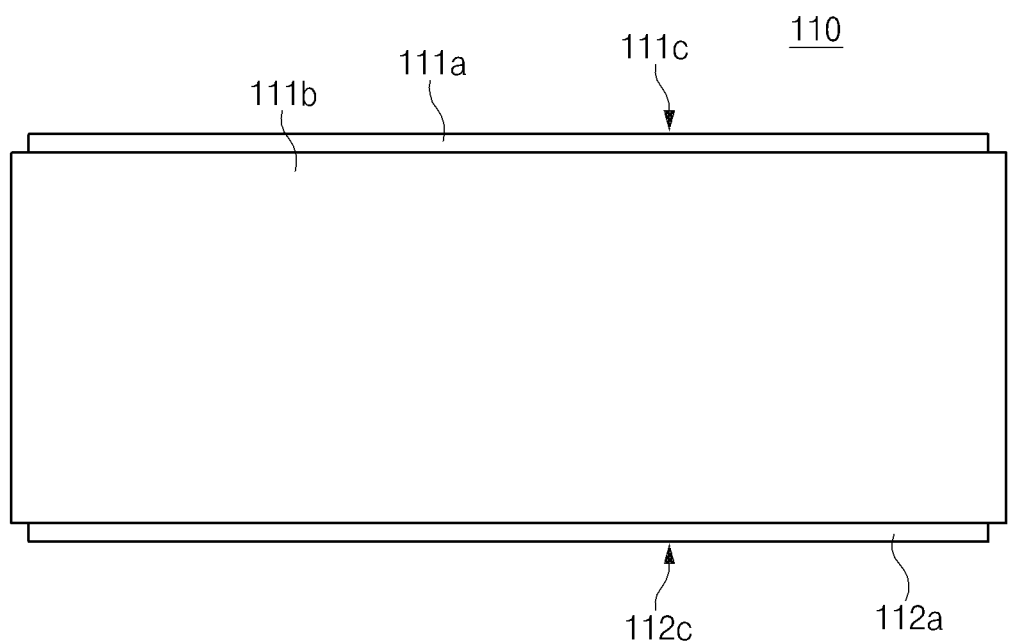
FIG. 6 is a plan view illustrating the state in which the electrode assembly is spread before being wound in the secondary battery according to the first embodiment of the present invention.

FIG. 5 is an exploded perspective view illustrating a state in which the electrode assembly is spread before being wound in the secondary battery according to the first embodiment of the present invention, and FIG. 6 is a plan view illustrating the state in which the electrode assembly is spread before being wound in the secondary battery according to the first embodiment of the present invention.

Referring to FIGS. 3 and 4, the electrode assembly 110 may be a chargeable and dischargeable power generation element and have a structure in which the electrode 113 and the separator 114 are combined and alternately stacked with each other. Here, the electrode assembly 110 may have a wound shape.

Referring to FIGS. 3 to 6, the electrode 113 may comprise the positive electrode 112 and the negative electrode 111. Also, the separator 114 separates and electrically insulates the positive electrode 112 and the negative electrode 111 from each other. Here, each of the positive electrode 112 and the negative electrode 111 may be provided in the form of a sheet and then be wound together with the separator 114 so as to be formed in a jelly roll type. Here, the electrode assembly 110 may be wound, for example, in a cylindrical shape. Also, each of the positive electrode 112, the separator 114, and the negative electrode 111 may form a plurality of layers in a thickness direction of the electrode assembly 110 that is perpendicular to a winding center axis C of the electrode assembly 110.

Referring to FIGS. 4 and 5, the negative electrode 111 may comprise a negative electrode collector 111a and a negative electrode active material 111b applied on the negative electrode collector 111a.

Also, the negative electrode 111 may be provided with a negative electrode non-coating portion 111c that is an area on which the negative electrode active material 111b is not applied to the negative electrode collector 111a.

For example, the negative electrode non-coating portion 111c may be disposed on an end of the electrode assembly in a direction of one side C1 to more protrude than the separator 14 with respect to the winding center axis C of the electrode assembly 110.

Also, the negative electrode non-coating portion 111c may be formed on an entire end of one side of the negative electrode 111 in a winding direction.

Furthermore, the negative electrode non-coating portion 111c may be formed to more extend than an end of the positive electrode 112 from the winding center axis C of the electrode assembly 110 in the direction of the one side C1. That is, for example, referring to FIG. 1, an end of the negative electrode collector 111a on the area of the negative electrode non-coating portion 111c may be formed to more protrude to an upper side of the electrode assembly 110 than the positive electrode 112. Thus, the end of the negative electrode collector 111a may contact an inner top surface of the first can 121 disposed on the upper portion thereof to allow the first can 121 to form a negative electrode terminal. Accordingly, when compared to a case in which the end of the negative electrode 111 directly contact the first can 121 and then is connected through a separate connection line, resistance may be significantly reduced to eventually prevent deterioration at a specific portion due to a positional deviation and reduce the total heat, thereby preventing cell performance from being deteriorated.

The negative electrode collector 111a may be, for example, foil made of a copper (Cu) or nickel (Ni) material. The negative electrode active material 111b may comprise, for example, synthetic graphite, lithium a metal, a lithium alloy, carbon, petroleum coke, activated carbon, graphite, a silicon compound, a tin compound, a titanium compound, or an alloy thereof. Here, the negative electrode active materials 111b may further comprise, for example, silica-based SiO or silica carbide (SiC).

Referring to FIGS. 4 and 5, the positive electrode 112 may comprise a positive electrode collector 112a and a positive electrode active material 112b applied on the positive electrode collector 112a.

Also, the positive electrode 112 may be provided with a positive electrode non-coating portion 112c that is an area on which the positive electrode active material 112b is not applied to the positive electrode collector 112a.

For example, the positive electrode non-coating portion 112c may be disposed on an end of the electrode assembly in a direction of the other side C2 to more protrude than the separator 14 with respect to the winding center axis C of the electrode assembly 110.

Also, the positive electrode non-coating portion 112c may be entirely formed on the other end of the positive electrode 112 in a winding direction.

Furthermore, the positive electrode non-coating portion 112c may be formed to more extend than an end of the negative electrode 111 from the winding center axis C of the electrode assembly 110 in the direction of the other side C2. That is, for example, referring to FIG. 1, an end of the positive electrode collector 112a on the area of the positive electrode non-coating portion 112c may be formed to more protrude to a lower side of the electrode assembly 110 than the negative electrode 111. Thus, for example, the end of the positive electrode collector 112a may contact an inner bottom surface of the second can 122 disposed on the lower portion thereof to allow the second can 122 to form a positive electrode terminal. Accordingly, when compared to a case in which the end of the positive electrode 112 directly contact the second can 122 and then is connected through a separate connection line, resistance may be significantly reduced to eventually prevent deterioration at a specific portion due to a positional deviation and reduce the total heat, thereby preventing cell performance from being deteriorated.

As described above, in the secondary battery according to the first embodiment of the present invention, all the electrodes 113 of the electrode assembly 110 may be directly connected continuously to the can 120 to reduce the resistance and the temperature deviation for each position of the electrodes 113.

For example, the positive electrode collector 112a may be provided as foil made of an aluminum material, and the positive electrode active material may be made of lithium manganese oxide, lithium cobalt oxide, lithium nickel oxide, lithium iron phosphate, or a compound or mixture thereof containing at least one or more of the above-described materials.

Referring to FIGS. 3 and 4, the separator 114 is made of an insulation material and alternately stacked with the positive electrode 112 and the negative electrode 111. Here, the separator 114 may be disposed between the positive electrode 112 and the negative electrode 111 and also disposed on outer surfaces of the positive electrode 112 and outside the negative electrode 111. Here, the separator 114 may be disposed at the outermost side in a width direction when the electrode assembly 110 is wound.

Also, the separator 114 may be made of a flexible material. Here, the separator 114 may be made of, for example, a polyolefin-based resin film such as polyethylene or polypropylene having micropores.

Hereinafter, a secondary battery according to a second embodiment will be described.

Figure 7:
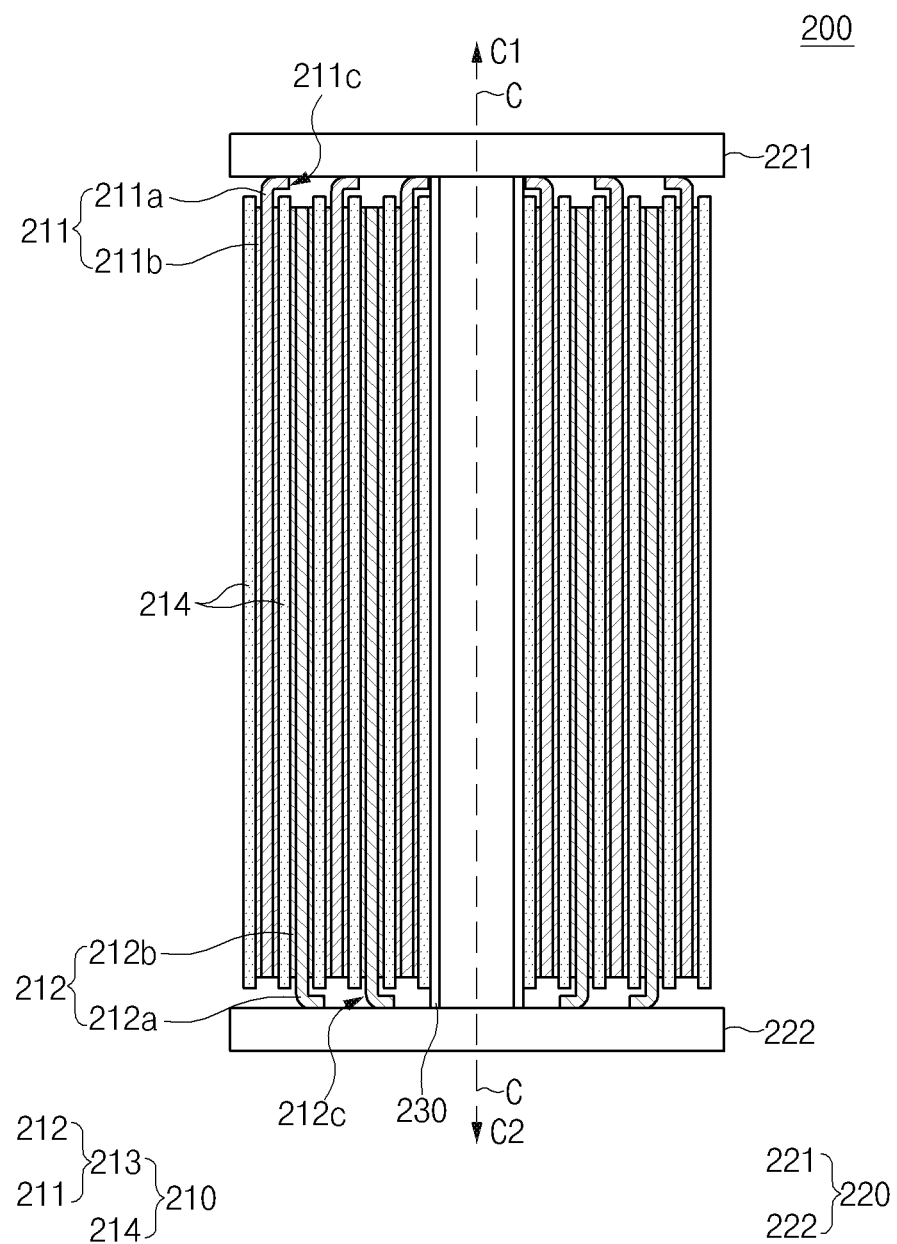
FIG. 7 is a cross-sectional view illustrating an example of a secondary battery according to a second embodiment of the present invention.

FIG. 7 is a cross-sectional view illustrating an example of a secondary battery according to a second embodiment of the present invention.

Referring to FIG. 7, a secondary battery 200 according to a second embodiment of the present invention comprise an electrode assembly 210 in which a positive electrode 212, a separator 214, and a negative electrode 211 are alternately stacked, a can 220 comprising a first can 221 and a second can 222 to accommodate the electrode assembly 210, and a center pin 230 disposed on a winding center portion of the electrode assembly 210. Here, a negative electrode non-coating portion 211c contacts the first can 221, and a positive electrode non-coating portion 212c contacts an inner surface of the second can 222. The negative electrode 211 may comprise a negative electrode collector 211a and a negative electrode active material 211b applied on the negative electrode collector 211a. The positive electrode 212 may comprise a positive electrode collector 212a and a positive electrode active material 212b applied on the positive electrode collector 212a.

The secondary battery 200 according to the second embodiment of the present invention is different from the secondary battery according to the first embodiment in that the center pin 230 is further provided. Thus, contents of this embodiment, which are duplicated with those according to the first embodiment, will be briefly described, and also, differences therebetween will be mainly described.

Figure 8:
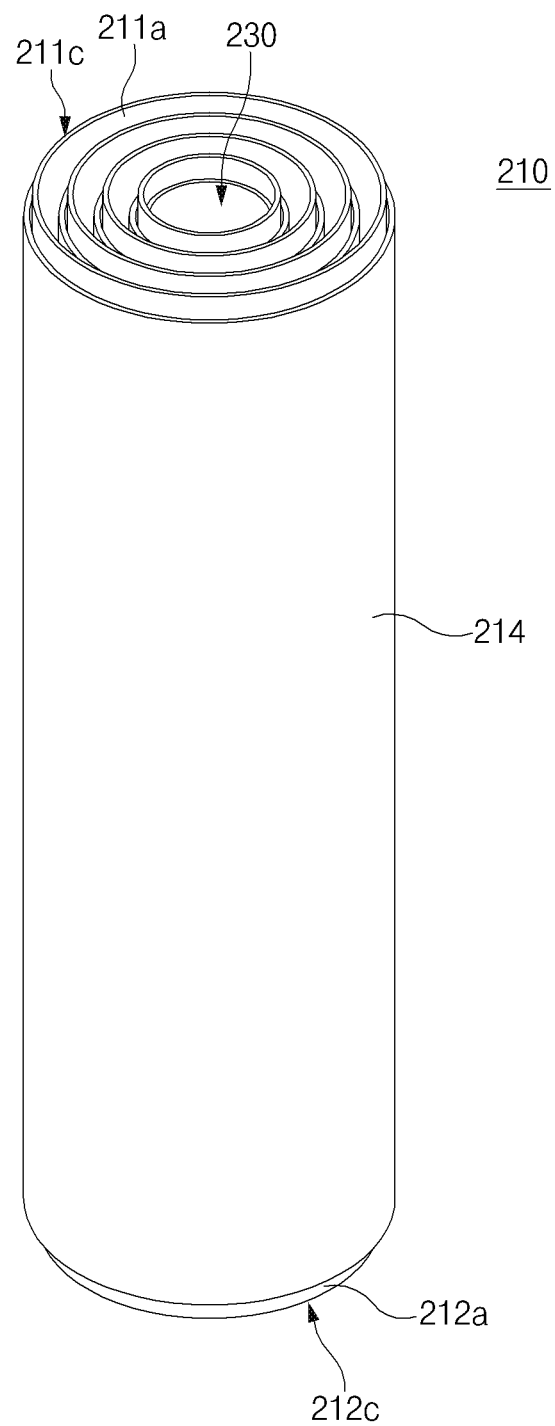
FIG. 8 is a perspective view of an electrode assembly in the secondary battery according to the second embodiment of the present invention.
Figure 9:
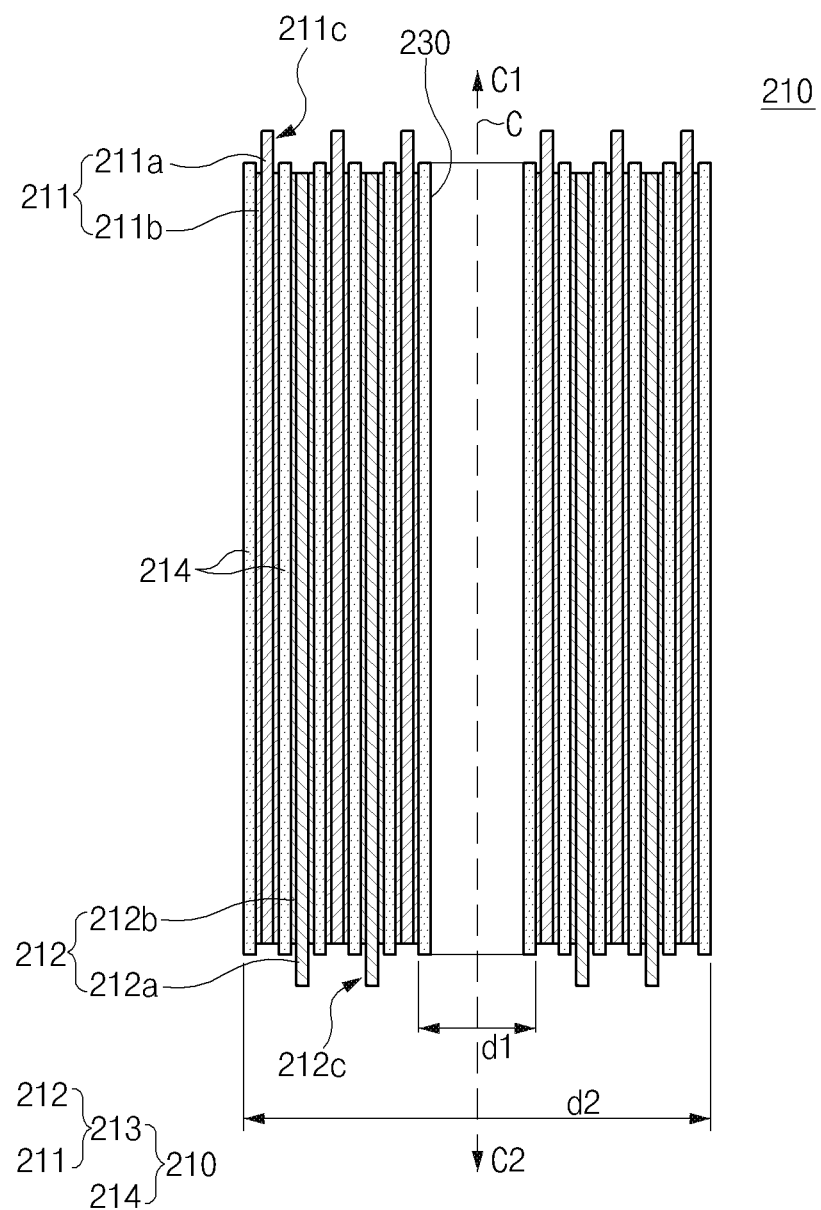
FIG. 9 is a cross-sectional view of the electrode assembly in the secondary battery according to the second embodiment of the present invention.

FIG. 8 is a perspective view of the electrode assembly in the secondary battery according to the second embodiment of the present invention, and FIG. 9 is a cross-sectional view of the electrode assembly in the secondary battery according to the second embodiment of the present invention.

Figure 10:
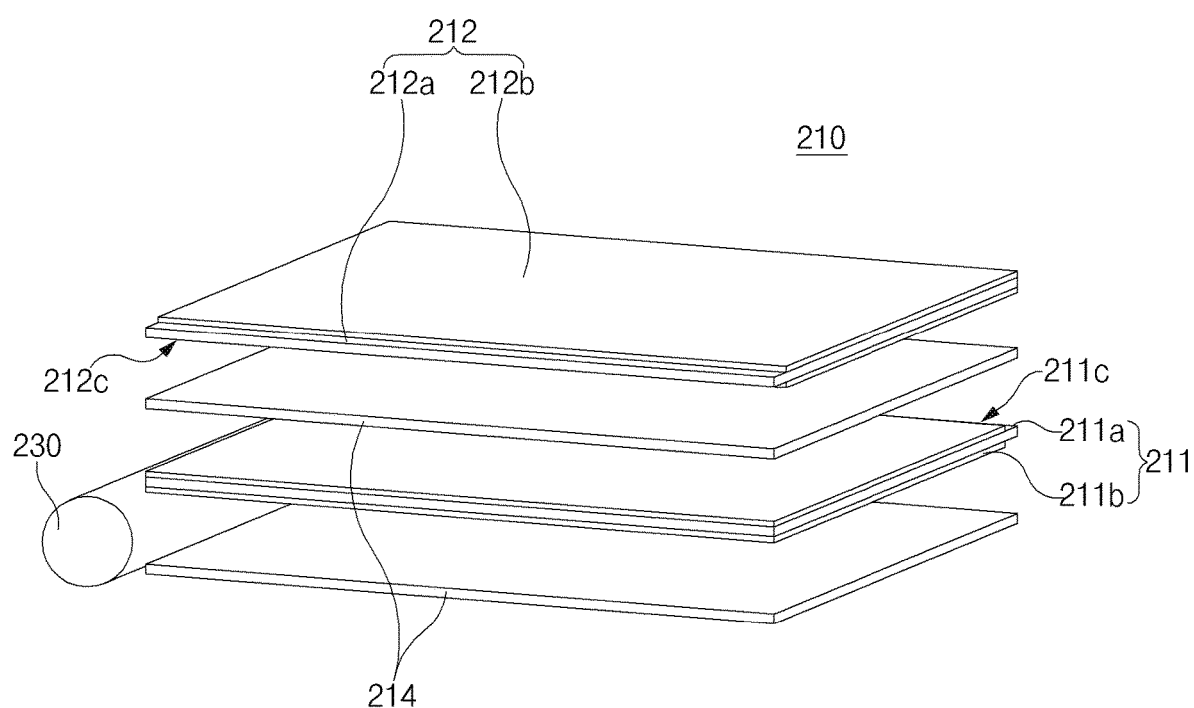
FIG. 10 is an exploded perspective view illustrating a state in which the electrode assembly is spread before being wound in the secondary battery according to the second embodiment of the present invention.

Also, FIG. 10 is an exploded perspective view illustrating a state in which the electrode assembly is spread before being wound in the secondary battery according to the second embodiment of the present invention, and FIG. is a plan view illustrating the state in which the electrode assembly is spread before being wound in the secondary battery according to the second embodiment of the present invention.

Referring to FIGS. 8 to 11, in the secondary battery 200 according to the second embodiment of the present invention, the center pin 230 may be disposed on the winding center portion of the electrode assembly 210 to provide a reference axis or a reference surface when the electrode assembly 210 is wound. Here, the electrode assembly 210 may be wound with respect to the center pin 230 while surrounding the center pin 230. Accordingly, when the positive electrode 212, the separator 214, and the negative electrode 211 are wound, meandering alignment of the positive electrode 212, the separator 214, and the negative electrode 211 may be improved through the center pin 230 (for reference, meandering refers to a phenomenon in which the positive electrode 212, the separator 214, and the negative electrode 211 are rolled to be inclined but are not rolled evenly during the winding).

Also, the center pin 230 may be provided at a core portion that is a central portion of the electrode assembly 210 to prevent the electrode 113 disposed on the core portion of the electrode assembly 210 from being cracked as a charging/discharging cycle is progressed.

Furthermore, each of the positive electrode 212, the separator 214, and the negative electrode 211 may be wound around an outer circumferential surface of the center pin 230 to form a plurality of layers in a thickness direction of the electrode assembly 210 that is perpendicular to a winding center axis C of the electrode assembly 210.

Figure 11:
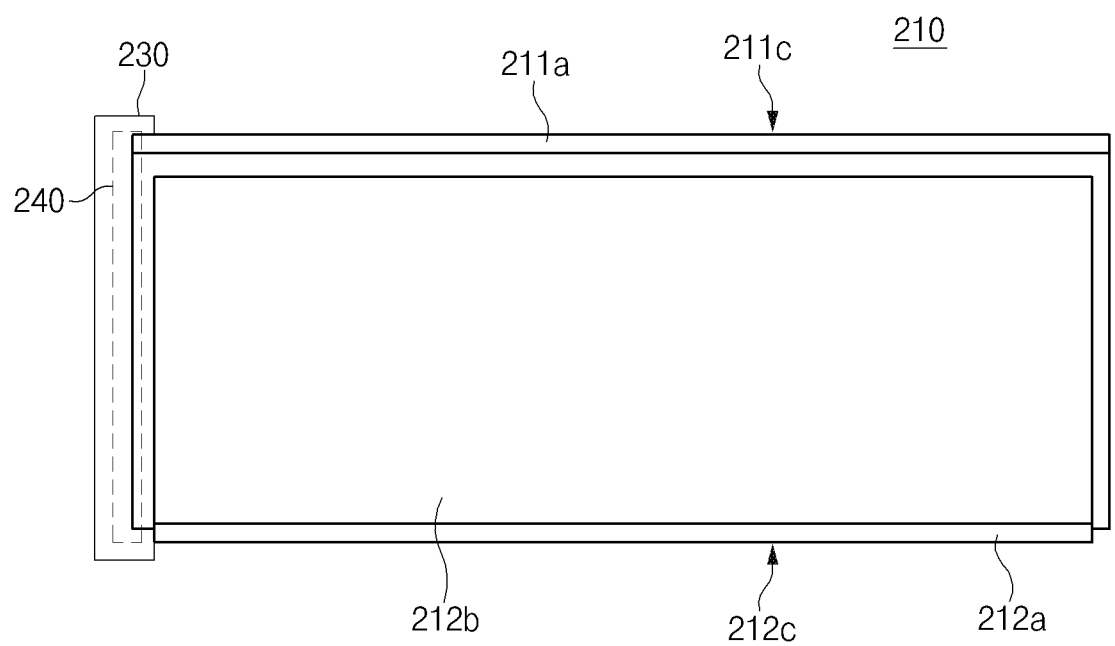
FIG. 11 is a plan view illustrating the state in which the electrode assembly is spread before being wound in the secondary battery according to the second embodiment of the present invention.

Also, the electrode assembly 210 may be wound while being fixed to the center pin 230 by using a tape 240 (see FIG. 11). When the tape fixing is used, the meandering alignment during the winding may be improved.

Also, the center pin 230 may comprise an insulation material.

Furthermore, the center pin 230 may be provided in a cylindrical shape of which a center side with respect to the central axis is empty.

Also, the center pin 230 may have a thickness of, for example, 0.1 mm to 1 mm. Particularly, the center pin 230 may have a thickness, for example, 0.2 mm to 0.5 mm.

Also, an outer diameter d1 of the center pin 230 may be 5% to 30% of an outer diameter d2 of the electrode assembly 210. Particularly, the outer diameter d1 of the center pin 230 may be, for example, 10% to 20% of the outer diameter d2 of the electrode assembly 210.

Furthermore, the center pin 230 may have a length less than a distance from one end of a negative electrode non-coating portion 211c to the other end of the positive electrode non-coating portion 212c in the direction of the winding center axis C of the electrode assembly 210. Here, the negative electrode non-coating portion 211c may extend longer in a direction of one side C1 than the center pin 230 with respect to the winding center axis C, and the positive electrode non-coating portion 212c may extend longer in a direction of the other side C2 than the center pin 230 with respect to the winding center axis C. Here, a length of the separator 214 in the direction of the winding center axis C of the electrode assembly 210 may be the same as that of the center pin 230.

Also, one side of the center pin 230 may surface-contact an inner surface of the first can 221, and the other side of the center pin 230 may surface-contact an inner surface of the second can 222.

In the secondary battery 200 configured as described above according to the second embodiment of the present invention, the negative electrode non-coating portion 211c is disposed on an end of the electrode assembly in a direction of one side of the electrode assembly so as to protrude more than the separator 214 with respect to a direction of the winding center axis C of the electrode assembly 210, the positive electrode non-coating portion 212c is disposed on an end of the electrode assembly in a direction of the other side C2 so as to protrude more than the separator 214, and the center pin 230 disposed on the winding center portion of the electrode assembly 210 has a length less than a distance from the one end of the negative electrode non-coating portion 211c to the other end of the positive electrode non-coating portion 212c.

Accordingly, in the shape in which the negative electrode non-coating portion 211c contacts the first can 221, and the positive electrode non-coating portion 212c contacts the inner surface of the second can 222, when the negative electrode collector 111b and the positive electrode collector 112a are pressed to increase in contact area, the center pin 230 may provide the reference surface to secure welding quality and resistance deviation to certain levels. That is, when the first can 221 and the second can 222 are pressed in a direction facing each other, if the first can 221 and the second can 222 are pressed up to a place at which the center pin 230 is disposed, the protruding portions of the positive electrode non-coating portion 212c and the negative electrode non-coating portion 211c, which protrude more than the center pin 230, may be bent (see FIG. 7) to uniformly directly contact the inner surfaces of the first can 221 and the second can 222. Therefore, when the ends of the positive electrode 212 and the negative electrode 211 are welded to the inner surface of the can 220, the welding quality may be improved, and the resistance deviation may be secured to a certain level.

Hereinafter, a secondary battery according to a third embodiment will be described.

Figure 12:
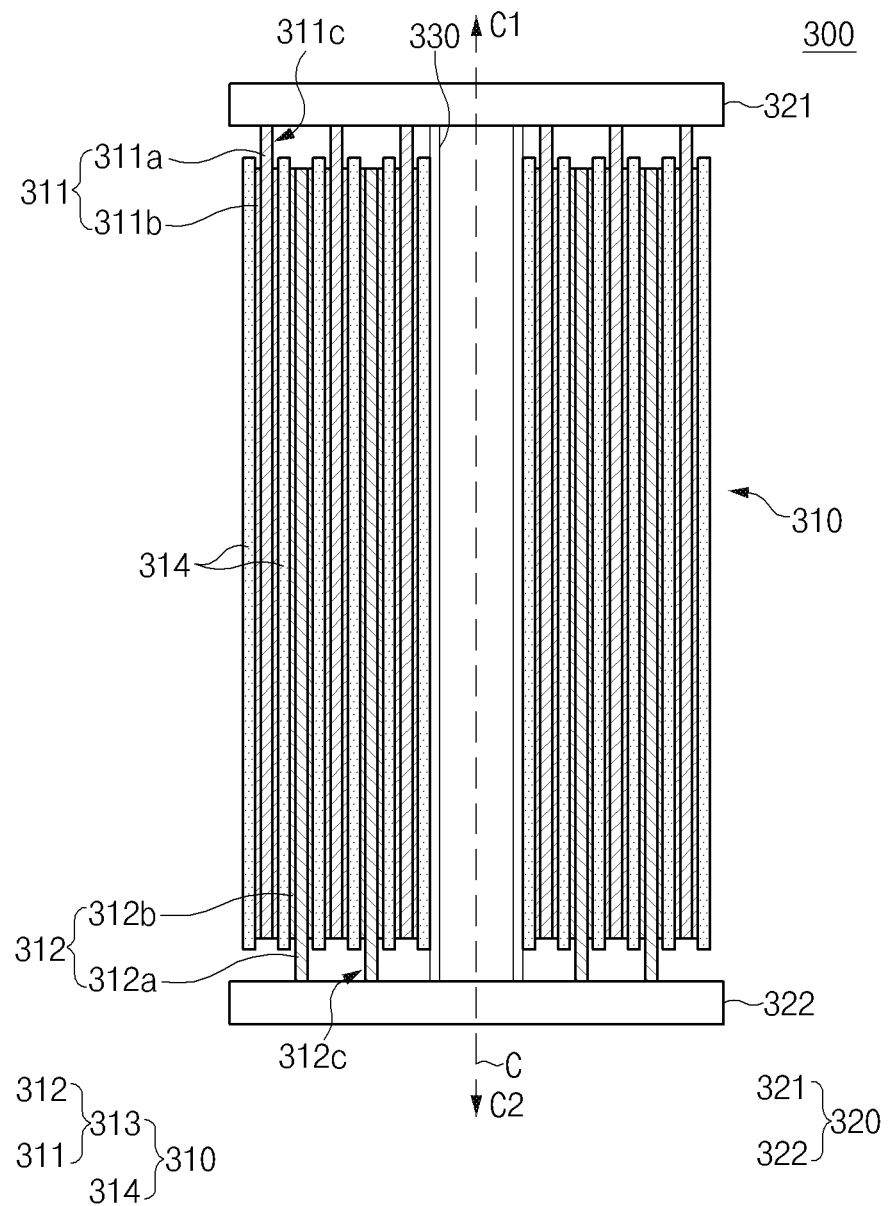
FIG. 12 is a cross-sectional view illustrating a secondary battery according to a third embodiment of the present invention.

FIG. 12 is a cross-sectional view illustrating a secondary battery according to a third embodiment of the present invention.

Figure 13:
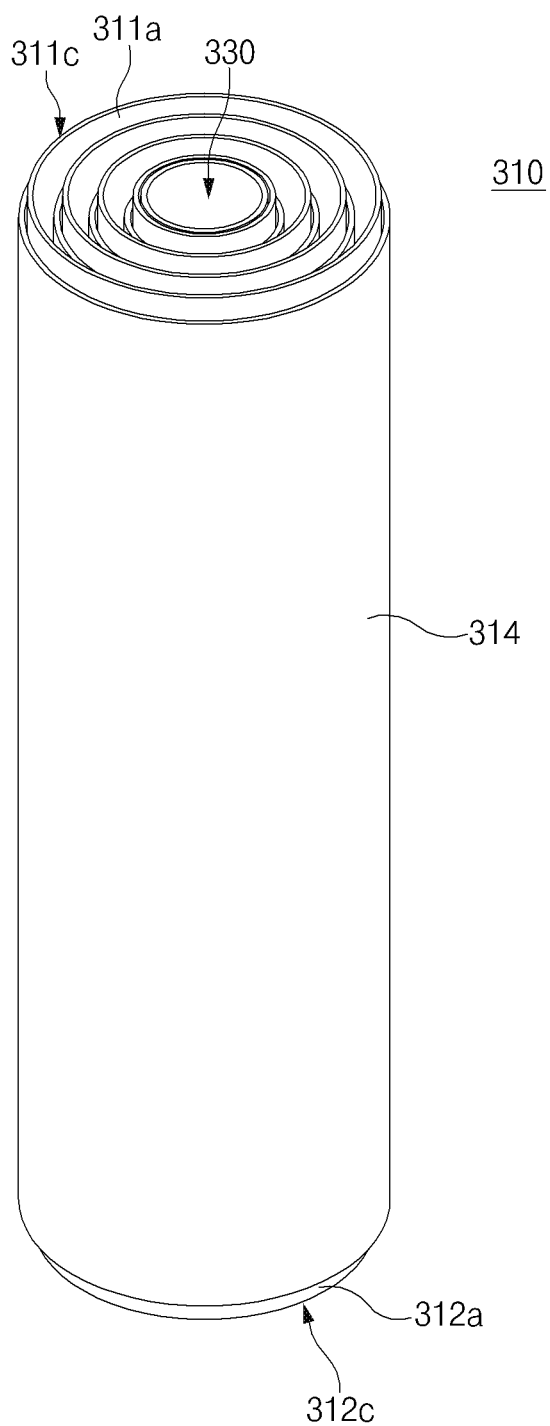
FIG. 13 is a perspective view of the electrode assembly in the secondary battery according to the third embodiment of the present invention.

Referring to FIGS. 12 and 13, a secondary battery 300 according to a third embodiment of the present invention comprise an electrode assembly 310 in which a positive electrode 312, a separator 314, and a negative electrode 311 are alternately stacked, a can 320 comprising a first can 321 and a second can 322 to accommodate the electrode assembly 310, and a center pin 330 disposed on a winding center portion of the electrode assembly 310. Here, a negative electrode non-coating portion 311c contacts the first can 321, and a positive electrode non-coating portion 312c contacts an inner surface of the second can 322. The negative electrode 311 may comprise a negative electrode collector 311a and a negative electrode active material 311b applied on the negative electrode collector 311a. The positive electrode 312 may comprise a positive electrode collector 312a and a positive electrode active material 312b applied on the positive electrode collector 312a.

The secondary battery 300 according to the third embodiment of the present invention is different from the secondary batteries according to the first and second embodiments in that the center pin 330 has a length different from that of the electrode assembly 310. Thus, contents of this embodiment, which are duplicated with those according to the first and second embodiments, will be briefly described, and also, differences therebetween will be mainly described.

FIG. 13 is a perspective view of the electrode assembly in the secondary battery according to the third embodiment of the present invention.

Referring to FIGS. 12 and 13, in the secondary battery 300 according to the third embodiment of the present invention, the center pin 330 may be disposed on the winding center portion of the electrode assembly 310 to provide a reference axis or a reference surface when the electrode assembly 310 is wound. Here, the electrode assembly 310 may be wound with respect to the center pin 330 while surrounding the center pin 330. Here, each of the positive electrode 312, the separator 314, and the negative electrode 311 may be wound around an outer circumferential surface of the center pin 330 to form a plurality of layers in a thickness direction of the electrode assembly 310 that is perpendicular to a winding center axis C of the electrode assembly 310.

Furthermore, the center pin 330 may comprise an insulation material.

Also, the center pin 330 may be provided in a cylindrical shape of which a center side with respect to the central axis is empty.

Also, the center pin 330 may have a length equal to a distance from one end of a negative electrode non-coating portion 311c to the other end of the positive electrode non-coating portion 312c in the direction of the winding center axis C of the electrode assembly 310. Here, a length of the separator 314 in the direction of the winding center axis C of the electrode assembly 310 may be less than that of the center pin 330.

Furthermore, one side of the center pin 330 may surface-contact an inner surface of the first can 321, and the other side of the center pin 330 may surface-contact an inner surface of the second can 322.

Hereinafter, a secondary battery according to a fourth embodiment will be described.

Figure 14:
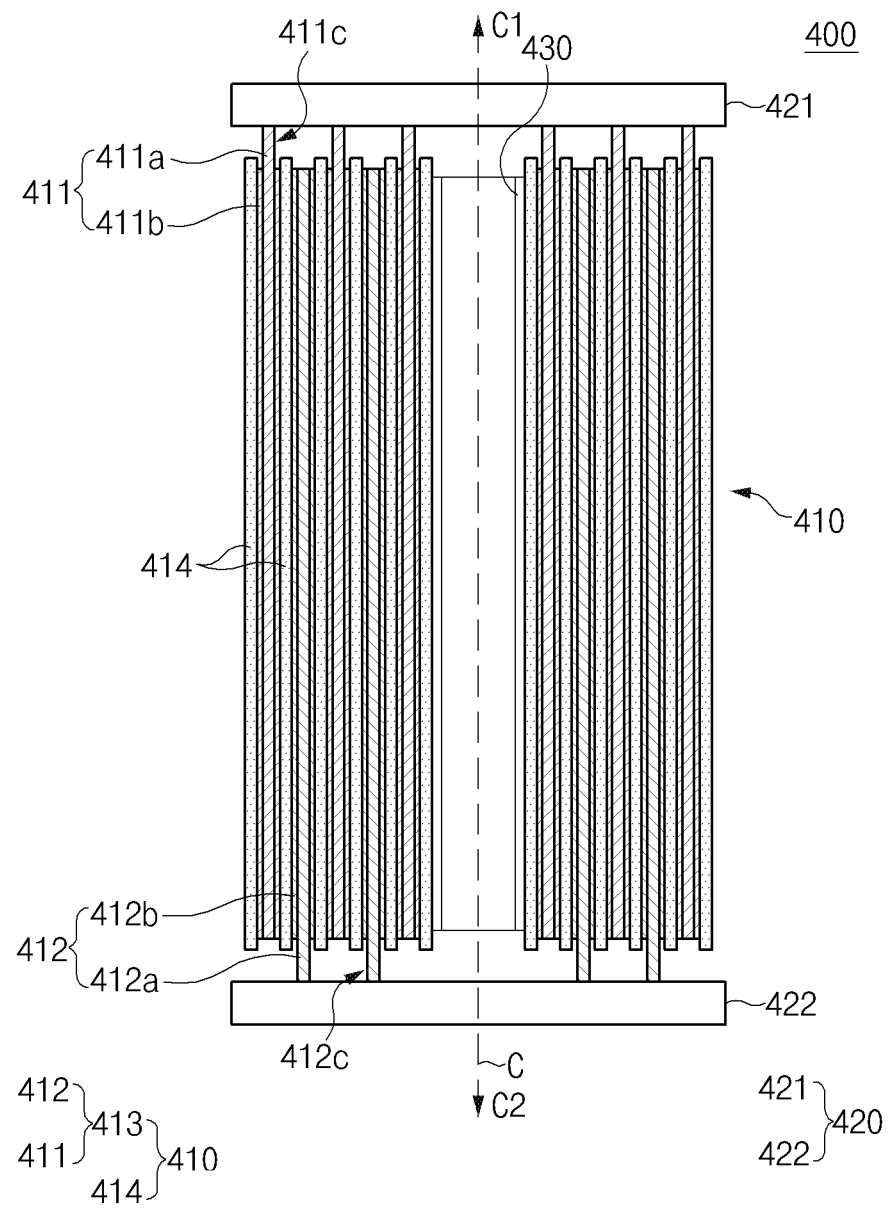
FIG. 14 is a cross-sectional view illustrating a secondary battery according to a fourth embodiment of the present invention.
Figure 15:
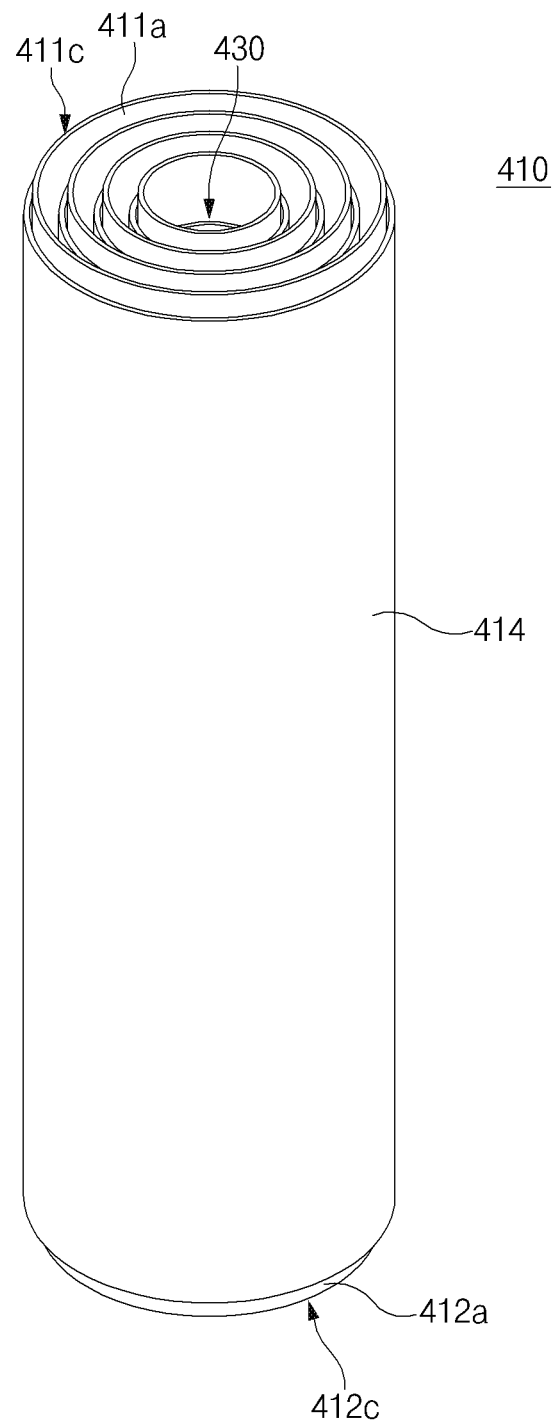
FIG. 15 is a perspective view of the electrode assembly in the secondary battery according to the fourth embodiment of the present invention.

FIG. 14 is a cross-sectional view illustrating a secondary battery according to a fourth embodiment of the present invention, and FIG. 15 is a perspective view of the electrode assembly in the secondary battery according to the fourth embodiment of the present invention.

Referring to FIGS. 14 and 15, a secondary battery 400 according to a fourth embodiment of the present invention comprise an electrode assembly 410 in which a positive electrode 412, a separator 414, and a negative electrode 411 are alternately stacked, a can 420 comprising a first can 421 and a second can 422 to accommodate the electrode assembly 410, and a center pin 430 disposed on a winding center portion of the electrode assembly 410. Here, a negative electrode non-coating portion 411c contacts the first can 421, and a positive electrode non-coating portion 412c contacts an inner surface of the second can 422. The negative electrode 411 may comprise a negative electrode collector 411a and a negative electrode active material 411b applied on the negative electrode collector 411a. The positive electrode 412 may comprise a positive electrode collector 412a and a positive electrode active material 412b applied on the positive electrode collector 412a.

The secondary battery 400 according to the fourth embodiment of the present invention is different from the secondary batteries according to the first to third embodiments in that the center pin 430 has a length different from that of the electrode assembly 410. Thus, contents of this embodiment, which are duplicated with those according to the forgoing embodiments, will be briefly described, and also, differences therebetween will be mainly described.

In the secondary battery 400 according to the fourth embodiment of the present invention, the center pin 430 may be disposed on the winding center portion of the electrode assembly 410 to provide a reference axis or a reference surface when the electrode assembly 410 is wound. Here, the electrode assembly 410 may be wound with respect to the center pin 430 while surrounding the center pin 430. Here, each of the positive electrode 412, the separator 414, and the negative electrode 411 may be wound around an outer circumferential surface of the center pin 430 to form a plurality of layers in a thickness direction of the electrode assembly 410 that is perpendicular to a winding center axis C of the electrode assembly 410.

Furthermore, the center pin 430 may comprise an insulation material.

Also, the center pin 430 may be provided in a cylindrical shape of which a center side with respect to the central axis is empty.

Also, the center pin 430 may have a length less than a distance from one end of a negative electrode non-coating portion 411c to the other end of the positive electrode non-coating portion 412c in the direction of the winding center axis C of the electrode assembly 410. Here, the negative electrode non-coating portion 411c may extend longer in a direction of one side C1 than the center pin 430 with respect to the winding center axis C, and the positive electrode non-coating portion 412c may extend longer in a direction of the other side C2 than the center pin 430 with respect to the winding center axis C.

Here, a length of the separator 414 in a direction of the winding center axis C of the electrode assembly 410 is greater than that of the center pin 430 and less than a distance from the one end of a negative electrode non-coating portion 411c to the other end of the positive electrode non-coating portion 412c.

One side of the center pin 430 may be disposed to be spaced apart from an inner surface of the first can 421, and the other of the center pin 430 may be disposed to be spaced apart from an inner surface of the second can 422.

In the secondary battery 400 configured as described above according to the fourth embodiment of the present invention, the center pin 430 may have the length less than the distance from the one end of a negative electrode non-coating portion 411c to the other end of the positive electrode non-coating portion 412c in the direction of the winding center axis C of the electrode assembly 410 and less than that of the separator 414, and both sides of the center pin 430 may be disposed to be further spaced apart from the first can 412 and the second can 422 to increase in electrolyte collection space and gas collection space.

Hereinafter, a secondary battery according to a fifth embodiment will be described.

Figure 16:
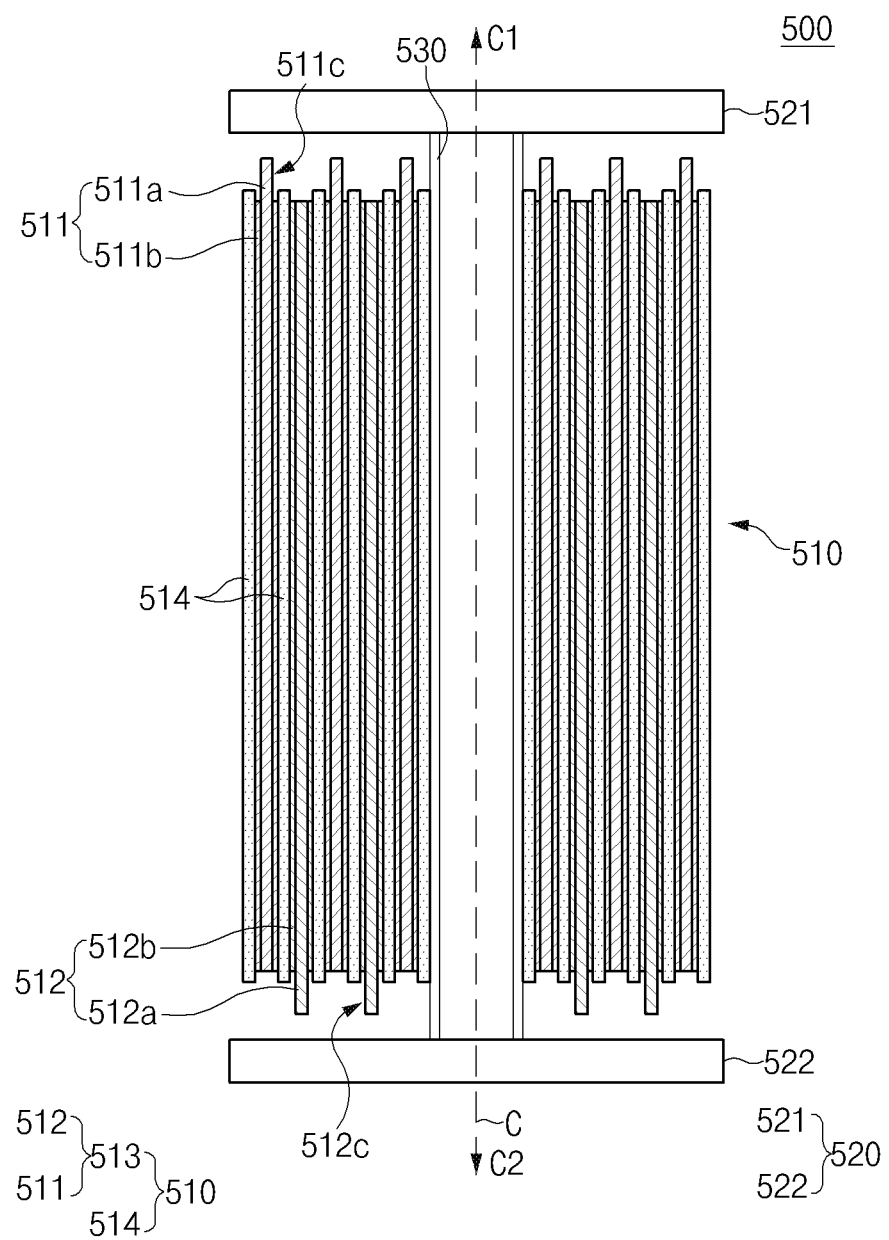
FIG. 16 is a cross-sectional view of a secondary battery according to a fifth embodiment of the present invention.
Figure 17:
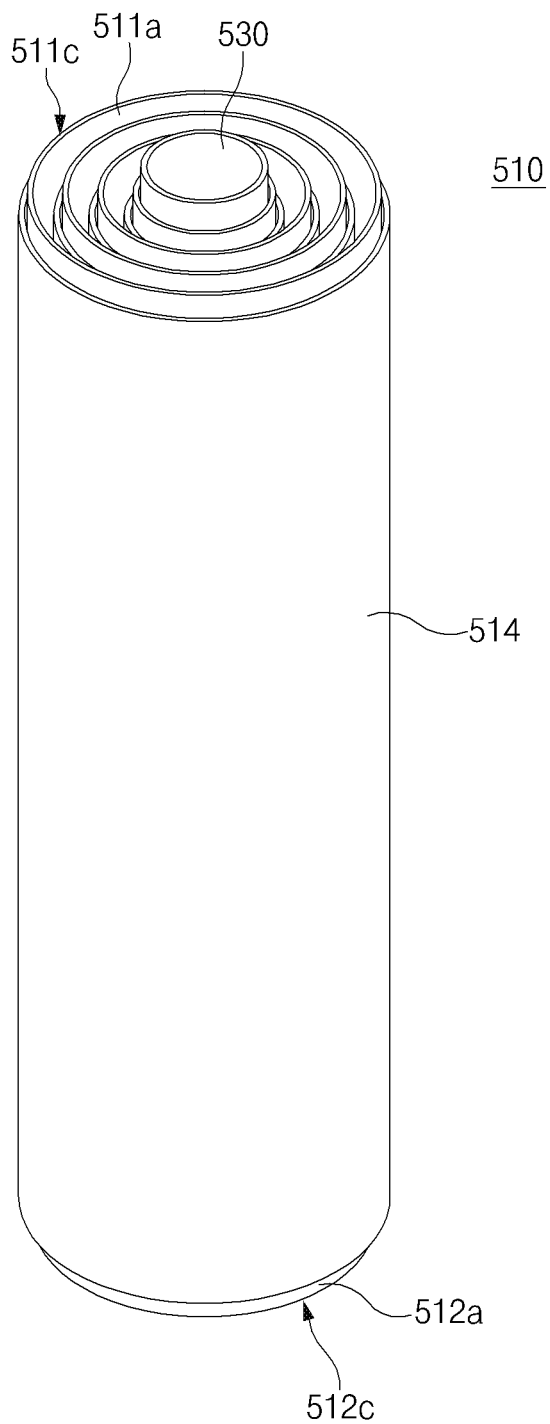
FIG. 17 is a perspective view of the electrode assembly in the secondary battery according to the fifth embodiment of the present invention.

FIG. 16 is a cross-sectional view of a secondary battery according to a fifth embodiment of the present invention, and FIG. 17 is a perspective view of the electrode assembly in the secondary battery according to the fifth embodiment of the present invention.

Referring to FIGS. 16 and 17, a secondary battery 500 according to a fifth embodiment of the present invention comprise an electrode assembly 510 in which a positive electrode 512, a separator 514, and a negative electrode 511 are alternately stacked, a can 520 comprising a first can 521 and a second can 522 to accommodate the electrode assembly 510, and a center pin 530 disposed on a winding center portion of the electrode assembly 510. Here, a negative electrode non-coating portion 511c contacts the first can 521, and a positive electrode non-coating portion 512c contacts an inner surface of the second can 522. The negative electrode 511 may comprise a negative electrode collector 511a and a negative electrode active material 511b applied on the negative electrode collector 511a. The positive electrode 512 may comprise a positive electrode collector 512a and a positive electrode active material 512b applied on the positive electrode collector 512a.

The secondary battery 500 according to the fifth embodiment of the present invention is different from the secondary batteries according to the first to fourth embodiments in that the center pin 530 has a length different from that of the electrode assembly 510. Thus, contents of this embodiment, which are duplicated with those according to the forgoing embodiments, will be briefly described, and also, differences therebetween will be mainly described.

In the secondary battery 500 according to the fifth embodiment of the present invention, the center pin 530 may be disposed on the winding center portion of the electrode assembly 510 to provide a reference axis or a reference surface when the electrode assembly 510 is wound. Here, the electrode assembly 510 may be wound with respect to the center pin 530 while surrounding the center pin 530. Here, each of the positive electrode 512, the separator 514, and the negative electrode 511 may be wound around an outer circumferential surface of the center pin 530 to form a plurality of layers in a thickness direction of the electrode assembly 510 that is perpendicular to a winding center axis C of the electrode assembly 510.

Also, the center pin 530 may comprise an insulation material.

Furthermore, the center pin 530 may be provided in a cylindrical shape of which a center side with respect to the central axis is empty.

Also, the center pin 530 may have a length greater than a distance from one end of a negative electrode non-coating portion 511c to the other end of the positive electrode non-coating portion 512c in the direction of the winding center axis C of the electrode assembly 510. Here, a length of the separator 514 in a direction of the winding center axis C of the electrode assembly 510 is less than a distance from the one end of a negative electrode non-coating portion 511c to the other end of the positive electrode non-coating portion 512c.

Also, one side of the center pin 530 may surface-contact an inner surface of the first can 521, and the other side of the center pin 530 may surface-contact an inner surface of the second can 522.

Hereinafter, a secondary battery according to a sixth embodiment will be described.

Figure 18:
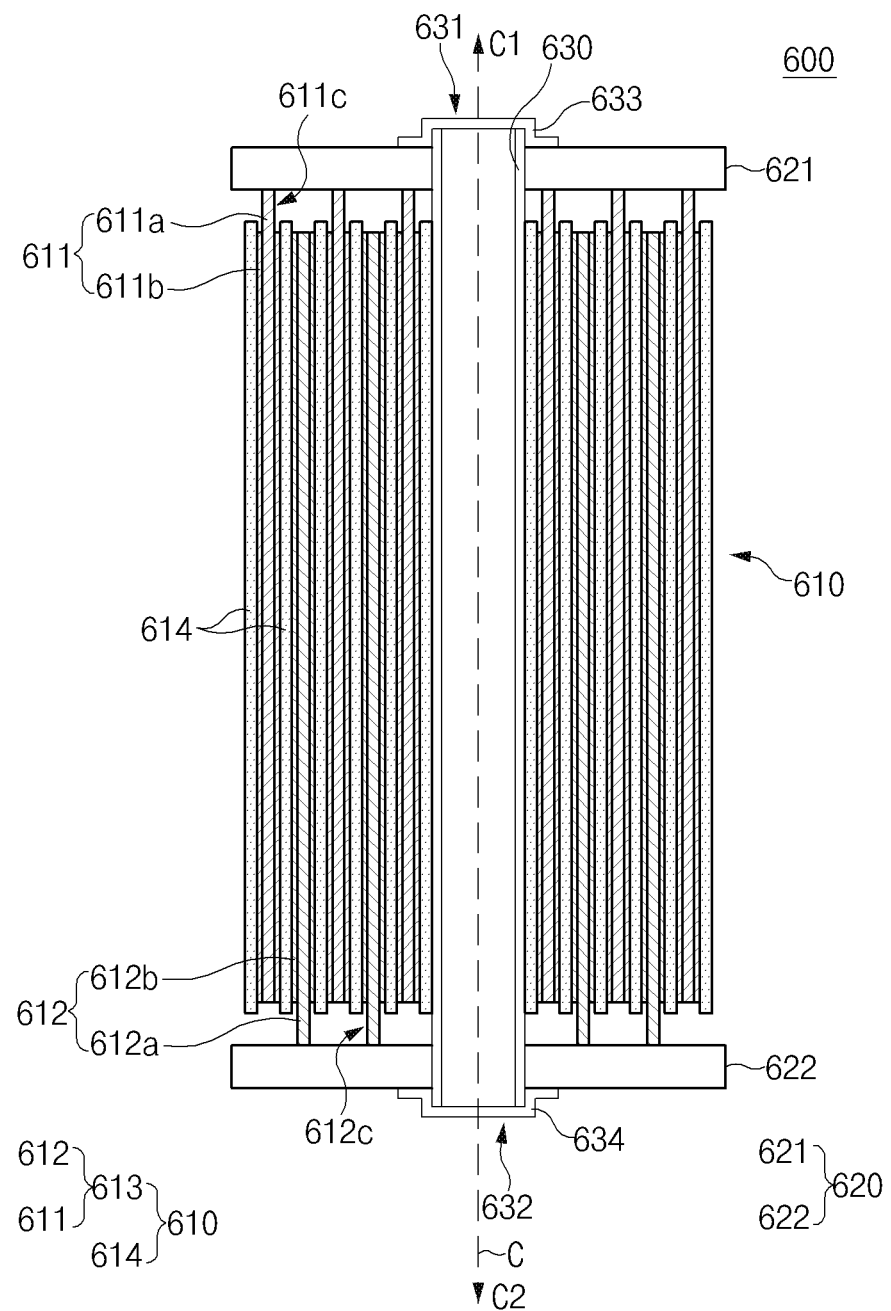
FIG. 18 is a cross-sectional view of a secondary battery according to a sixth embodiment of the present invention.

FIG. 18 is a cross-sectional view of a secondary battery according to a sixth embodiment of the present invention.

Referring to FIG. 18, a secondary battery 600 according to a sixth embodiment of the present invention comprise an electrode assembly 610 in which a positive electrode 612, a separator 614, and a negative electrode 611 are alternately stacked, a can 620 comprising a first can 621 and a second can 622 to accommodate the electrode assembly 610, and a center pin 630 disposed on a winding center portion of the electrode assembly 610. Here, a negative electrode non-coating portion 611*c* contacts the first can 621, and a positive electrode non-coating portion 612*c* contacts an inner surface of the second can 622. The negative electrode 611 may comprise a negative electrode collector 611*a* and a negative electrode active material 611*b* applied on the negative electrode collector 611*a*. The positive electrode 612 may comprise a positive electrode collector 612*a* and a positive electrode active material 612*b* applied on the positive electrode collector 612*a*.

The secondary battery 600 according to the sixth embodiment of the present invention is different from the secondary batteries according to the first to fifth embodiments in that the center pin 630 serves as a terminal. Thus, contents of this embodiment, which are duplicated with those according to the forgoing embodiments, will be briefly described, and also, differences therebetween will be mainly described.

In the secondary battery 600 according to the sixth embodiment of the present invention, the center pin 630 may be disposed on the winding center portion of the electrode assembly 610 to provide a reference axis or a reference surface when the electrode assembly 610 is wound. Here, the electrode assembly 610 may be wound with respect to the center pin 630 while surrounding the center pin 630. Here, each of the positive electrode 612, the separator 614, and the negative electrode 611 may be wound around an outer circumferential surface of the center pin 630 to form a plurality of layers in a thickness direction of the electrode assembly 610 that is perpendicular to a winding center axis C of the electrode assembly 610.

Also, the center pin 630 may comprise an insulation material.

Furthermore, the center pin 630 may be provided in a circular column shape or a cylindrical shape of which a center side with respect to the central axis is empty.

Also, the center pin 630 may have a length greater than a distance from one end of a negative electrode non-coating portion 611*c* to the other end of the positive electrode non-coating portion 612*c* in the direction of the winding center axis C of the electrode assembly 610. Here, a length of the separator 614 in a direction of the winding center axis C of the electrode assembly 610 is less than a distance from the one end of a negative electrode non-coating portion 611*c* to the other end of the positive electrode non-coating portion 612*c*.

The center pin 630 may protrude to the outside of the first can 621 and the second can 622. At this time, a central side of each of the first can 621 and the second can 622 may be fixed to the center pin 630.

Here, the center pin 630 may comprise an insulation material, and one side and the other side of the center pin 630 may be coated with conductive materials 633 and 634 in the direction of the winding center axis C of the electrode assembly 610.

Here, the first can 621 and one side of the center pin 630 may be electrically connected to each other so that the one side of the center pin 630 forms a negative electrode terminal 631, and the second can 622 and the other side of the center pin 630 may be electrically connected to each other so that the other side of the center pin 630 forms a positive electrode terminal 632.

In the secondary battery 600 configured as described above according to the sixth embodiment, the center pin 630 may protrude to the outside of the first can 621 and the second can 622, the one side of the center pin 630 may form the negative electrode terminal 631, and the other side of the center pin 630 may form the positive electrode terminal 632. Therefore, when the battery pack is manufactured, the center pin 630 may be utilized as an external terminal.

While the present invention has been particularly shown and described with reference to exemplary embodiments thereof, it is to be understood that the scope of the present invention is not limited to the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A secondary battery comprising:
   an electrode assembly in which a positive electrode, a separator, and a negative electrode are alternately stacked;
   a can configured to accommodate the electrode assembly; and
   a center pin disposed in a winding center portion of the electrode assembly,
   wherein the negative electrode is disposed on an end of the electrode assembly in a direction of one side of the electrode assembly so that a negative electrode non-coating portion that is not coated with a negative electrode active material protrudes more than the separator with respect to a direction of a winding center axis of the electrode assembly,
   the positive electrode is disposed on an end of the electrode assembly in a direction of an opposite side of the electrode assembly so that a positive electrode non-coating portion that is not coated with a positive electrode active material protrudes more than the separator with respect to the direction of the winding center axis of the electrode assembly,
   the electrode assembly is wound while surrounding the center pin,
   the can comprises a first can and a second can,
   the negative electrode non-coating portion directly contacts an inner surface of the first can, and the positive electrode non-coating portion directly contacts an inner surface of the second can, and
   a top surface of the center pin is coplanar with a top surface of the electrode assembly and a bottom surface of the center pin is coplanar with a bottom surface of the electrode assembly.

2. The secondary battery of claim 1, wherein the negative electrode non-coating portion is formed on an entire end of one side of the negative electrode in a winding direction, and the positive electrode non-coating portion is formed on an entire end of an opposite side of the positive electrode in the winding direction.

3. The secondary battery of claim 1, wherein the electrode assembly is wound in a state of being fixed to the center pin by a tape.

4. The secondary battery of claim 1, wherein each of the positive electrode, the separator, and the negative electrode is wound around an outer circumferential surface of the center pin to form a plurality of layers in a thickness direction of the electrode assembly with respect to the winding center axis of the electrode assembly.

5. The secondary battery of claim 1, wherein the center pin comprises an insulation material.

6. The secondary battery of claim 1, wherein the center pin is provided in a cylindrical shape.

7. The secondary battery of claim 1, wherein a length of the separator in the direction of the winding center axis of the electrode assembly is the same as the length of the center pin.

8. The secondary battery of claim 1, wherein the negative electrode non-coating portion is bent to contact the first can, and
the positive electrode non-coating portion is bent to contact the second can.

9. The secondary battery of claim 1, wherein the center pin is hollow.

10. A secondary battery comprising:
an electrode assembly in which a positive electrode, a separator, and a negative electrode are alternately stacked;
a can configured to accommodate the electrode assembly; and
a center pin disposed in a winding center portion of the electrode assembly,
wherein the negative electrode is disposed on an end of the electrode assembly in a direction of one side of the electrode assembly so that a negative electrode non-coating portion that is not coated with a negative electrode active material protrudes more than the separator with respect to a direction of a winding center axis of the electrode assembly,
the positive electrode is disposed on an end of the electrode assembly in a direction of an opposite side of the electrode assembly so that a positive electrode non-coating portion that is not coated with a positive electrode active material protrudes more than the separator with respect to the direction of the winding center axis of the electrode assembly,
the electrode assembly is wound while surrounding the center pin,
the can comprises a first can and a second can,
the negative electrode non-coating portion directly contacts an inner surface of the first can, and the positive electrode non-coating portion directly contacts an inner surface of the second can, and
a length of the center pin in the direction of the winding center axis of the electrode assembly is the same as a distance from an end of one side of the negative electrode non-coating portion to an end of an opposite side of the positive electrode non-coating portion.

11. The secondary battery of claim 10, wherein a length of the separator in the direction of the winding center axis of the electrode assembly is greater than the length of the center pin and less than a distance from the end of the one side of the negative electrode non-coating portion to the end of the opposite side of the positive electrode non-coating portion.

12. The secondary battery of claim 11, wherein one side of the center pin is disposed to be spaced apart from the inner surface of the first can, and
an opposite side of the center pin is disposed to be spaced apart from the inner surface of the second can.

13. The secondary battery of claim 10, wherein one side of the center pin surface-contacts the inner surface of the first can, and an opposite side of the center pin surface-contacts the inner surface of the second can.

14. A secondary battery comprising:
an electrode assembly in which a positive electrode, a separator, and a negative electrode are alternately stacked;
a can configured to accommodate the electrode assembly; and
a center pin disposed in a winding center portion of the electrode assembly,
wherein the negative electrode is disposed on an end of the electrode assembly in a direction of one side of the electrode assembly so that a negative electrode non-coating portion that is not coated with a negative electrode active material protrudes more than the separator with respect to a direction of a winding center axis of the electrode assembly,
the positive electrode is disposed on an end of the electrode assembly in a direction of an opposite side of the electrode assembly so that a positive electrode non-coating portion that is not coated with a positive electrode active material protrudes more than the separator with respect to the direction of the winding center axis of the electrode assembly,
the electrode assembly is wound while surrounding the center pin,
the can comprises a first can and a second can,
the negative electrode non-coating portion directly contacts an inner surface of the first can, and the positive electrode non-coating portion directly contacts an inner surface of the second can, and
one side of the center pin surface-contacts the inner surface of the first can, and an opposite side of the center pin surface-contacts the inner surface of the second can.

15. A secondary battery comprising:
an electrode assembly in which a positive electrode, a separator, and a negative electrode are alternately stacked;
a can configured to accommodate the electrode assembly; and
a center pin disposed in a winding center portion of the electrode assembly,
wherein the negative electrode is disposed on an end of the electrode assembly in a direction of one side of the electrode assembly so that a negative electrode non-coating portion that is not coated with a negative electrode active material protrudes more than the separator with respect to a direction of a winding center axis of the electrode assembly,
the positive electrode is disposed on an end of the electrode assembly in a direction of an opposite side of the electrode assembly so that a positive electrode non-coating portion that is not coated with a positive electrode active material protrudes more than the separator with respect to the direction of the winding center axis of the electrode assembly, the electrode assembly is wound while surrounding the center pin, the can comprises a first can and a second can, the negative electrode non-coating portion directly contacts an inner surface of the first can, and the positive electrode non-coating portion directly contacts an inner surface of the second can, and a length of the center pin in the direction of the winding center axis of the electrode assembly is greater than a distance from an end of one side of the negative electrode non-coating portion to an end of an opposite side of the positive electrode non-coating portion such that the center pin extends beyond both the negative electrode non-coating portion and the positive electrode non-coating portion.

16. A secondary battery comprising:

an electrode assembly in which a positive electrode, a separator, and a negative electrode are alternately stacked;

a can configured to accommodate the electrode assembly; and a center pin disposed in a winding center portion of the electrode assembly, wherein the negative electrode is disposed on an end of the electrode assembly in a direction of one side of the electrode assembly so that a negative electrode non-coating portion that is not coated with a negative electrode active material protrudes more than the separator with respect to a direction of a winding center axis of the electrode assembly, the positive electrode is disposed on an end of the electrode assembly in a direction of an opposite side of the electrode assembly so that a positive electrode non-coating portion that is not coated with a positive electrode active material protrudes more than the separator with respect to the direction of the winding center axis of the electrode assembly, the electrode assembly is wound while surrounding the center pin, the can comprises a first can and a second can, the negative electrode non-coating portion directly contacts an inner surface of the first can, and the positive electrode non-coating portion directly contacts an inner surface of the second can, a length of the center pin in the direction of the winding center axis of the electrode assembly is greater than a distance from an end of one side of the negative electrode non-coating portion to an end of an opposite side of the positive electrode non-coating portion, and the center pin protrudes to an outside of the first can and the second can.

17. The secondary battery of claim 16, wherein the center pin comprises an insulation material, a conductive material is applied to one side and an opposite side of the center pin in the direction of the winding center axis of the electrode assembly, the first can and the one side of the center pin are electrically connected to each other so that the one side of the center pin forms a positive electrode terminal, and the second can and the opposite side of the center pin are electrically connected to each other so that the opposite side of the center pin forms a negative electrode terminal.

18. The secondary battery of claim 16, wherein a central portion of each of the first can and the second can is fixed to the center pin.

* * * * *